United States Patent
Wu et al.

(10) Patent No.: US 11,251,917 B2
(45) Date of Patent: Feb. 15, 2022

(54) METHOD FOR TRANSMITTING DMRS OF PHYSICAL BROADCAST CHANNEL, NETWORK DEVICE AND TERMINAL

(71) Applicant: VIVO MOBILE COMMUNICATION CO., LTD., Chang'an Dongguan (CN)

(72) Inventors: Kai Wu, Chang'an Dongguan (CN); Yu Ding, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 2 days.

(21) Appl. No.: 16/633,656

(22) PCT Filed: Jul. 2, 2018

(86) PCT No.: PCT/CN2018/093979
§ 371 (c)(1),
(2) Date: Jan. 24, 2020

(87) PCT Pub. No.: WO2019/019868
PCT Pub. Date: Jan. 31, 2019

(65) Prior Publication Data
US 2020/0213051 A1    Jul. 2, 2020

(30) Foreign Application Priority Data
Jul. 26, 2017   (CN) .......................... 201710620589.9

(51) Int. Cl.
*H04W 4/00*      (2018.01)
*H04L 5/00*      (2006.01)
*H04W 72/00*     (2009.01)

(52) U.S. Cl.
CPC ......... *H04L 5/0048* (2013.01); *H04W 72/005* (2013.01)

(58) Field of Classification Search
CPC .......................... H04L 5/0048; H04W 72/005
(Continued)

(56) References Cited

U.S. PATENT DOCUMENTS

2017/0353254 A1 * 12/2017 Islam .................. H01Q 3/2605
2018/0098337 A1    4/2018 Lee et al.
(Continued)

FOREIGN PATENT DOCUMENTS

CN     109150448 A      1/2019
EP        3425825 A1 *  1/2019   ........ H04W 72/0466
(Continued)

OTHER PUBLICATIONS

NTT Docomo (R1-1711062, Discussion on sequence design of DMRS for NR-PBCH, Qingdao, P.R. China Jun. 27-30, 2017) (Year: 2017).*
(Continued)

*Primary Examiner* — Maharishi V Khirodhar
(74) *Attorney, Agent, or Firm* — von Briesen & Roper, s.c.

(57) ABSTRACT

A method for transmitting a DMRS of a physical broadcast channel, a network device and a terminal for performing the method are provided. The method includes: configuring a demodulation reference signal DMRS sequence of a new radio physical broadcast channel NR-PBCH, where the DMRS sequence is configured to indicate a position relation between a synchronization signal block to which the NR-PBCH belongs and a system frame where the SS block is located; and transmitting the DMRS sequence of the NR-PBCH to a terminal. The configuring the DMRS sequence of the NR-PBCH includes: configuring phase rotation information of the DMRS sequence of the NR-PBCH. The position relation between the SS block to which the NR-PBCH belong and the system frame where the SS block is located includes: the SS block being located in a first or last 5 ms of the system frame where the SS block is located.

20 Claims, 6 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2018/0241605 A1* | 8/2018 | Luo | ..................... | H04W 56/00 |
| 2018/0262308 A1* | 9/2018 | Si | ......................... | H04L 5/0048 |
| 2018/0367269 A1* | 12/2018 | Ly | ..................... | H04L 27/2613 |
| 2019/0058620 A1* | 2/2019 | Liu | ..................... | H04W 56/002 |
| 2019/0200306 A1* | 6/2019 | Ko | ...................... | H04B 7/0617 |
| 2020/0119965 A1* | 4/2020 | Harada | ................ | H04W 72/04 |
| 2020/0154376 A1* | 5/2020 | Ko | ...................... | H04J 11/0069 |
| 2020/0187159 A1* | 6/2020 | Ko | .................... | H04W 56/001 |
| 2020/0328869 A1* | 10/2020 | Liu | .......................... | H04L 5/10 |

FOREIGN PATENT DOCUMENTS

| | | |
|---|---|---|
| EP | 3425825 A1 | 1/2019 |
| WO | WO 2016/163623 A1 | 10/2016 |

OTHER PUBLICATIONS

Ericsson (R1-1709868, Summary of email discussion [89-15] Details for NR-PBCH evaluation, Hangzhou, China, May 15-19, 2017). (Year: 2017).*

Chinese First Office Action Application No. 201710620589.9; reported on Mar. 10, 2020.

European Search Report Application No. 18839334.2; reported on Jul. 1, 2020.

VIVO; "Discussion on SS block time index indication", 3GPP TSG RAN WG1 Meeting #89, R1-1707227, Hangzhou, P.R. China, May 15, 2017-May 19, 2017.

VIVO; "Discussion on SS block time index indication", 3GPP TSG RAN WG1 NR Ad-Hoc#2, R1-1710373, Qingdao, P.R. China, Jun. 37, 2017-Jun. 30, 2017.

NTT Docomo, Inc.; "Discussion on timing indication based on SS block for NR", 3GPP TSG RAN WG1 NR Ad-Hoc#2, R1-1711058, Qingdao, P.R. China, Jun. 27, 2017-Jun. 30, 2017-06-30.

NTT Docomo, Inc.; "Discussion on NR-PBCH design and SS block composition", 3GPP TSG RAN WG1 NR Ad-Hoc#2, R1-1711622, Qingdao, P.R. China, Jun. 27, 2017-Jun. 30, 2017.

Xinwei; "Discussion on timing indication based on SS block", 3GPP TSG RAN WG1 NR Ad-Hoc #2, R1-1710223, Qingdao, P.R. China, Jun. 27, 2017-Jun. 30, 2017.

Ericsson; "Summary of email discussion [89-15] Details for NR-PBCH evaluation", 3GPP TSG RAN WG1 Meeting #89, R1-1709868, Hangzhou, China, May 15, 2017-May 19, 2017.

NTT Docomo, Inc.; "Discussion on sequence design of DMRS for NR-PBCH", 3GPP TSG RAN WG1 NR Ad-Hoc#2, R1-1711062, Qingdao. P.R. China, Jun. 27, 2017-Jun. 30, 2017.

* cited by examiner

METHOD FOR TRANSMITTING DMRS OF PHYSICAL BROADCAST CHANNEL, NETWORK DEVICE AND TERMINAL

CROSS-REFERENCE TO RELATED APPLICATION

This application is a 35 USC § 371 U.S. national stage of International Application No. PCT/CN2018/093979 filed on Jul. 2, 2018, which claims priority of Chinese Patent Application No. 201710620589.9 filed on Jul. 26, 2017, which is incorporated in herein by reference in its entirety.

TECHNICAL FIELD

The present disclosure relates to the field of communication technologies, and in particular to a method for transmitting a DMRS of a physical broadcast channel, a network device and a terminal.

BACKGROUND

A terminal needs to perform a cell search to find a position where the terminal is located and a cell to which the position belongs, synchronizes with the cell, and receives and decodes necessary information for communications with the cell and normal operations, before the terminal communicates with a core network. Specifically, the terminal obtains downlink synchronization and physical layer cell identification information (hereinafter referred to as Cell ID) of the cell by detecting a primary synchronization signal (hereinafter referred to as PSS) and a secondary synchronization signal (hereinafter referred to as SSS) at a specific position, and obtains necessary system information of the cell by receiving a physical broadcast channel (hereinafter referred to as PBCH) signal.

In a design of a New Radio (hereinafter referred to as NR) system, a Synchronization Signal block (hereinafter referred to as SS block) is proposed, and timing information is obtained through an NR-PSS and an NR-SSS to assist the cell search, where the timing is obtained through the NR-PSS in the SS Block, the Cell ID is obtained through the NR-SSS, and the necessary system information is transmitted through the NR-PBCH. As shown in FIG. 1, each of an NR-PSS sequence and an NR-SSS sequence has a length of 127, and is mapped to 127 consecutive subcarriers on a time-domain OFDM symbol, which needs to occupy 12 physical resource blocks (hereinafter referred to as NR-PRBs) as frequency-domain resources. A bandwidth of the NR-PBCH is 288 subcarriers, and frequency-domain resources required to be occupied by the NR-PBCH are 24 NR-PRBs. Each SS block includes NR-PSS, NR-SSS, and NR-PBCH, which have a mapping relation in a time-division multiplexed manner. Each SS block occupies 4 consecutive OFDM symbols, the NR-PSS is mapped before the NR-SSS, and a time-domain sequenced relationship of each SS block is that NR-PSS, NR-PBCH, NR-SSS, and NR-PBCH are arranged in sequence. Specifically, for the NR-PSS occupying 127 consecutive subcarriers, one NR-PRB occupies 12 subcarriers in a frequency direction, the NR-PSS occupies subcarrier resources having 10 complete NR-PRB lengths on one OFDM symbol, and the NR-PSS is further mapped to 3 subcarriers and 4 subcarriers, respectively on two subcarrier resources that are on both sides of these subcarrier resources and are adjacent to these subcarrier resources. In such a manner, the NR-PSS is mapped to 12 NR-PRBs, and the specific mapping mode is shown in FIG. 2. Further, the NR-SSS is mapped to the same subcarriers on a corresponding OFDM symbol as the NR-PSS.

In addition, in the design of the NR system, as shown in FIG. 3, an SS block includes specific time information of a current transmission, which includes: a system frame number (hereinafter referred to as SFN), and an indication $c_0$ for indicating whether the SS block is in the first 5 ms or in the last 5 ms of a system frame where the SS block is located, and a time index of the SS block. In addition to transmitting some pieces of minimum information, an SS block time index of an NR-PBCH that is currently transmitted by a terminal needs to be indicated in the NR-PBCH, the SS block time index at most has 64 possibilities, and information having a maximum of 6 bits needs to be transmitted. The SS block time index is transmitted in two parts, where 2 bits or 3 bits are indicated through a demodulation reference signal (hereinafter referred to as DMRS) sequence of the NR-PBCH, and the remaining bits are transmitted through a payload of the NR-PBCH. In this way, a terminal can obtain part of the SS block time index without NR-PBCH detection and NR-PBCH decoding when performing a neighboring cell measurement, by carrying 2 bits or 3 bits of the SS block time index through the DMRS of the NR-PBCH. However, the 2 bits or 3 bits still can not indicate whether a currently transmitted SS block is in the first 5 ms or in the last 5 ms of a system frame, resulting in that the terminal can not determine a position relation between the SS block and the system frame.

SUMMARY

In a first aspect, an embodiment of the present disclosure provides a method for transmitting a DMRS of a physical broadcast channel, which is applied to a network device side and includes:

configuring a demodulation reference signal DMRS sequence of a new radio physical broadcast channel NR-PBCH, where the DMRS sequence is configured to indicate a position relation between a synchronization signal block (SS block) to which the NR-PBCH belongs and a system frame where the SS block is located; and transmitting the DMRS sequence of the NR-PBCH to a terminal.

In a second aspect, an embodiment of the present disclosure further provides a network device, including:

a configuration module, configured to configure a demodulation reference signal DMRS sequence of a new radio physical broadcast channel NR-PBCH, where the DMRS sequence is configured to indicate a position relation between a synchronization signal block (SS block) to which the NR-PBCH belongs and a system frame where the SS block is located; and a transmission module, configured to transmit the DMRS sequence of the NR-PBCH to a terminal.

In a third aspect, an embodiment of the present disclosure provides a network device. The network device includes a processor, a memory, and a computer program that is stored on the memory and executable on the processor. When executing the computer program, the processor is configured to implement steps in the method for transmitting a DMRS of a physical broadcast channel as described above.

In a fourth aspect, an embodiment of the present disclosure provides a computer-readable storage medium. The computer-readable storage medium stores a computer program, and the computer program is executed by a processor to implement steps in the method for transmitting a DMRS of a physical broadcast channel as described above.

In a fifth aspect, an embodiment of the present disclosure provides a method for transmitting a DMRS of a physical broadcast channel, which is applied to a terminal side and includes:

receiving a demodulation reference signal DMRS sequence of a new radio physical broadcast channel NR-PBCH transmitted by a network device; and determining, according to the DMRS sequence, a position relation between a synchronization signal block (SS block) to which the NR-PBCH belongs and a system frame where the SS block is located.

In a sixth aspect, an embodiment of the present disclosure further provides a terminal, including:

a receipt module, configured to receive a demodulation reference signal DMRS sequence of a new radio physical broadcast channel NR-PBCH transmitted by a network device; and a first processing module, configured to determine, according to the DMRS sequence, a position relation between a synchronization signal block (SS block) to which the NR-PBCH belongs and a system frame where the SS block is located.

In a seventh aspect, an embodiment of the present disclosure provides a terminal. The terminal includes a processor, a memory, and a computer program that is stored on the memory and executable on the processor. When executing the computer program, the processor is configured to implement steps in the method for transmitting a DMRS of a physical broadcast channel as described above.

In an eighth aspect, an embodiment of the present disclosure provides a computer-readable storage medium. The computer-readable storage medium stores a computer program, and when the computer program is executed by a processor, steps of the method for transmitting a DMRS of a physical broadcast channel as described above are implemented.

BRIEF DESCRIPTION OF THE DRAWINGS

In order to describe technical solutions of embodiments of the present disclosure more clearly, drawings used in the description of the embodiments of the present disclosure are briefly illustrated below. Obviously, the drawings in the following description are just some embodiments of the present disclosure. For those of ordinary skill in the art, other drawings can be obtained based on these drawings without creative effort.

DETAILED DESCRIPTION

Exemplary embodiments of the present disclosure are described below in detail with reference to the accompanying drawings. Understandably, although the exemplary embodiments of the present disclosure are illustrated with reference to the accompanying drawings, the present disclosure may be embodied in many different forms and should not be construed as being limited to the embodiments set forth herein. On the contrary, these embodiments are provided so that the present disclosure will be thorough, and will fully convey the scope of the present disclosure to a person of ordinary skill in the art.

Terms "first", "second" and the like in the specification and claims of the present disclosure are adopted not to describe a specific sequence or order but to distinguish similar objects. It should be understood that data used like this may be interchanged under a proper condition for implementation of the embodiments of the present disclosure described herein in a sequence apart from those shown or described herein. In addition, terms "include" and "have" and any variant thereof are intended to cover nonexclusive inclusions. For example, a process, method, system, product or equipment including a series of steps or units is not limited to those steps or units which are clearly listed, but may include other steps or units which are not clearly listed or intrinsic to the process, the method, the product or the equipment.

Figure 1:
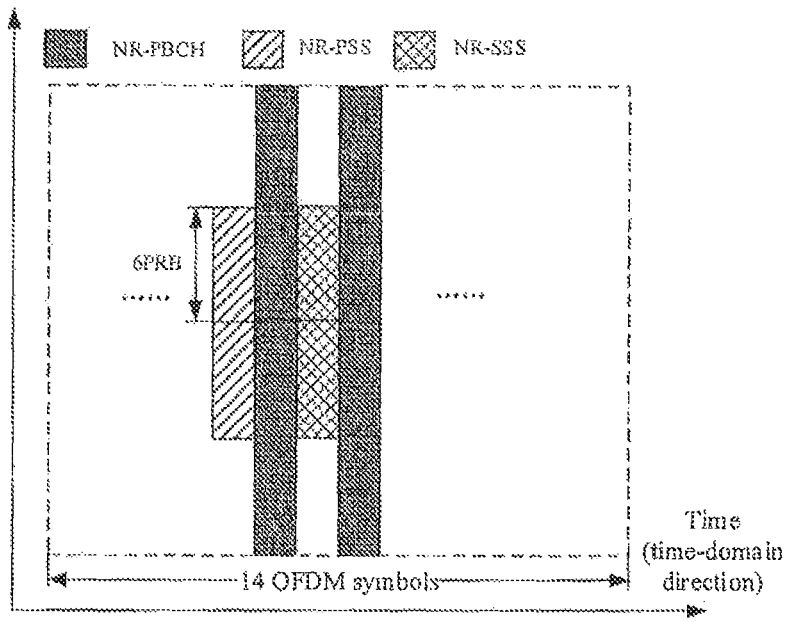
FIG. 1 shows a schematic diagram of resource mapping of a synchronization signal block (SS block) in an NR system.
Figure 2:
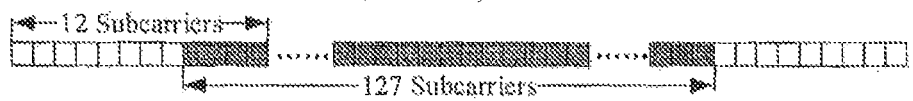
FIG. 2 shows a schematic diagram of resource mapping of a PSS or an SSS in an NR system.
Figure 3:
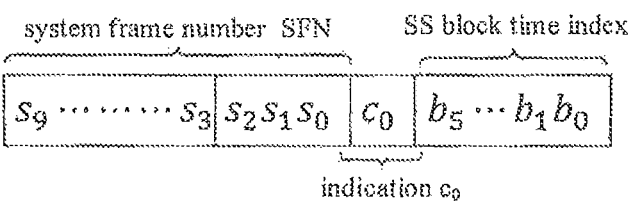
FIG. 3 shows a schematic diagram of an information format of time information of an SS block in an NR system.
Figure 4:
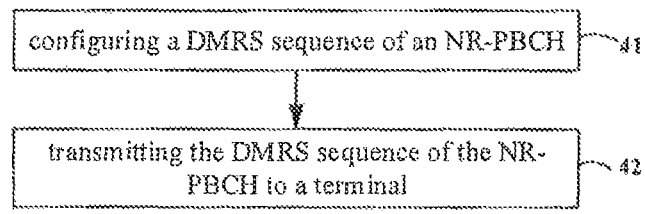
FIG. 4 shows a schematic flowchart of a method for transmitting a DMRS of a physical broadcast channel applied in a network device side according to an embodiment of the present disclosure.

A method for transmitting a DMRS of a physical broadcast channel is provided according to an embodiment of the present disclosure, which is applied to a network device side. As shown in FIG. 4, the method specifically includes the following steps 41 and 42.

Step 41: configuring a DMRS sequence of an NR-PBCH.

An SS block includes specific time information of a current transmission, including: SFN, indication $c_0$ for indicating whether the SS block is in the first 5 ms or in the last 5 ms of a system frame where the SS block is located, and a time index of the SS block (SS Block time index). The DMRS sequence is used to indicate a position relation between an SS block to which the NR-PBCH belongs and a system frame where the SS block is located. The position relation between the SS block to which the NR-PBCH belongs and the system frame where the SS block is located includes: the SS block being located in the first 5 ms of the system frame where the SS block is located; or the SS block being located in the last 5 ms of the system frame where the SS block is located. That is, the DMRS sequence implicitly carries the indication $c_0$. Further, the NR-PBCH occupies two OFDM symbols, and DMRS sequences transmitted on the two OFDM symbols may be two sequences that are independent and different, or two sequences that are identical, or may form one complete sequence.

Step 42: transmitting the DMRS sequence of the NR-PBCH to a terminal.

Accordingly, the terminal receives the DMRS sequence of the NR-PBCH that is configured and transmitted, by a network device, and the DMRS sequence implicitly indicates the position relation between the SS block and the system frame where the SS block is located. In this way, the terminal can obtain the position relation between the SS block and the system frame where the SS block is located, so as to solve a problem that a position relation between a currently transmitted SS block and a system frame can not be indicated in an NR system. Therefore, an SS block can be accurately detected in transmission resources of a system frame.

In this way, by indicating a position relation between an SS block and a system frame through a DMRS sequence in the embodiments of the present disclosure, a terminal can obtain the position relation between the SS block and the system frame based on the DMRS sequence, thereby improving utilization efficiency of the DMRS sequence.

Further, step 41 may be implemented with reference to the following manners.

A first manner includes: configuring phase rotation information of the DMRS sequence of the NR-PBCH. The phase rotation information of the DMRS sequence is used to indicate the position relation between the SS block to which the NR-PBCH belongs and the system frame where the SS block is located, which includes: the SS block being located in the first 5 ms of the system frame where the SS block is located; or the SS block being located in the last 5 ms of the system frame where the SS block is located. The phase rotation information includes information about a phase difference of a phase of a DMRS sequence transmitted on a second time-domain symbol in transmission resources of the NR-PBCH relative to a phase of a DMRS sequence transmitted on a first time-domain symbol in the transmission resources of the NR-PBCH.

In the first manner, 1-bit information is indicated by using a phase rotation between DMRS sequences on OFDM symbols where two NR-PBCHs are located, that is, the above indication $c_0$ that the SS block is located in the first 5 ms or in the last 5 ms of the system frame where the SS block is located.

Figure 5:
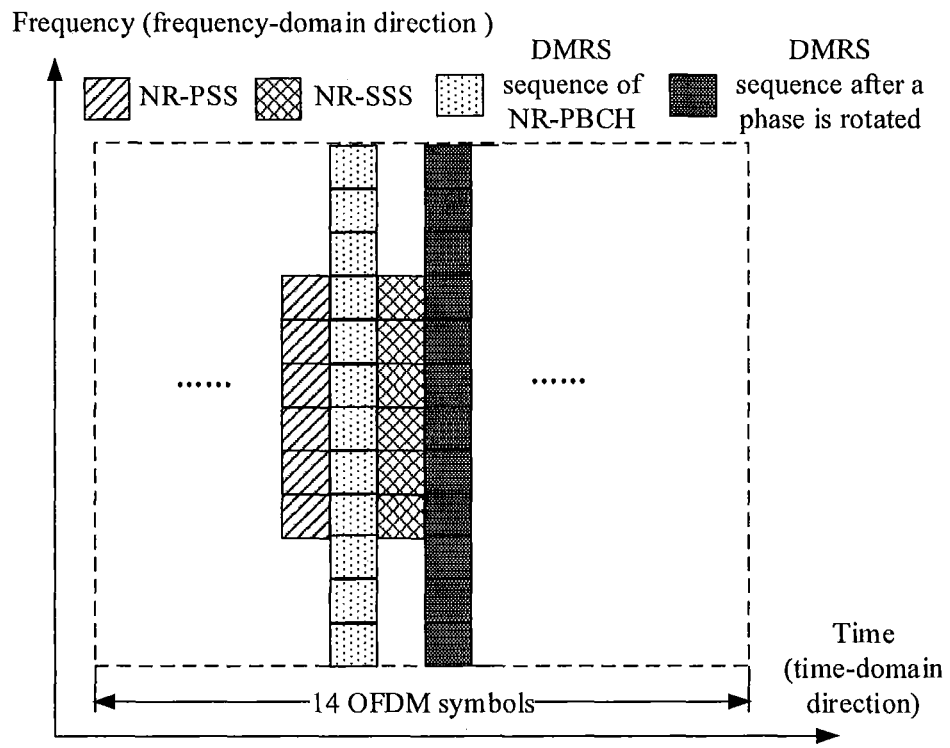
FIG. 5 shows a schematic diagram of transmission resource mapping in a first manner according to an embodiment of the present disclosure.

Specifically, the 1-bit information is transmitted through different phase rotations between the DMRS sequences on the OFDM symbols where the two NR-PBCHs is located. For example, phase rotations of $\{0, \pi\}$ are introduced to the second OFDM symbol, as shown in FIG. 5. The DMRS sequence on the first OFDM symbol is shown in FIG. 5. In a case that a phase of the DMRS sequence on the second OFDM symbol does not rotate (the phase rotation is 0) relative to a phase of the DMRS sequence on the first OFDM symbol, this case indicates that the SS block where the NR-PBCH is located is in the first 5 ms of the system frame; and in a case that a phase of the DMRS sequence on the second OFDM symbol rotates by $\pi$ (the phase rotation is $\pi$) relative to a phase of the DMRS sequence on the first OFDM symbol, this case indicates that the SS block where the NR-PBCH is located is in the last 5 ms of the system frame.

A second manner includes: configuring a mapping mode of the DMRS sequence of the NR-PBCH. The mapping mode of the DMRS sequence is used to indicate the position relation between the SS block to which the NR-PBCH belongs and the system frame where the SS block is located, that is, whether the SS block is located in the first 5 ms or in the last 5 ms of a system frame where the SS block is located.

Specifically, the mapping mode of the DMRS sequence includes at least one selected from the group of: a mapping mode based on different orders, a mapping mode based on a time-domain symbol, and a mapping mode based on a frequency band.

The second manner is to indicate 1-bit information through different mapping modes of the DMRS sequence, that is, the above-mentioned indication $c_0$ that the SS block is located in the first 5 ms or in the last 5 ms of the system frame where the SS block is located.

Figure 6:
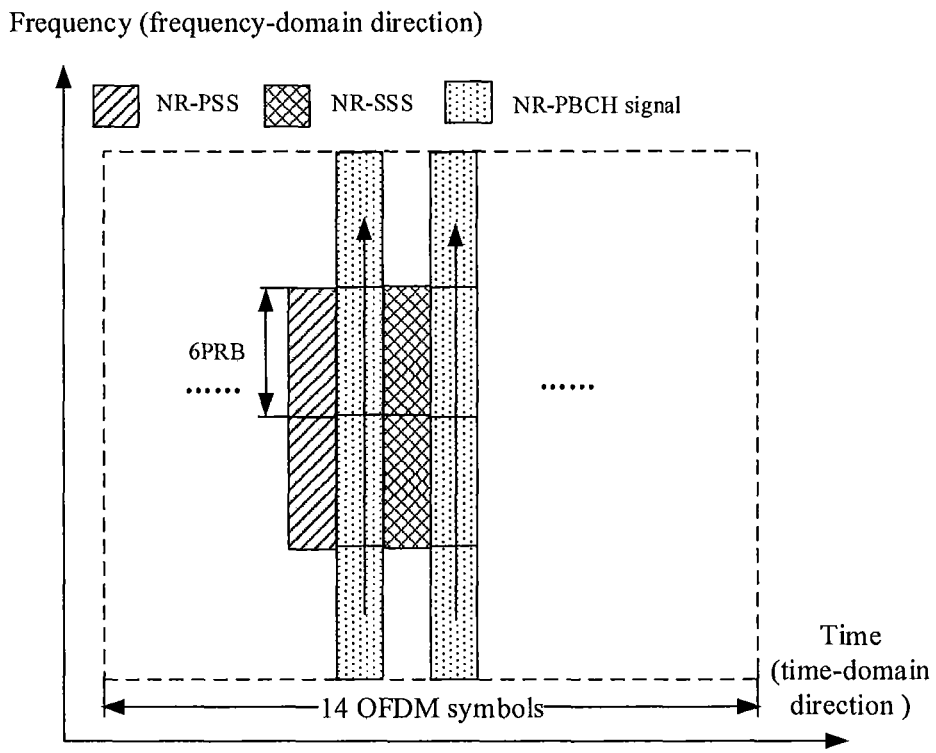
FIG. 6 shows a first schematic diagram of transmission resource mapping in a second manner according to an embodiment of the present disclosure.
Figure 7:
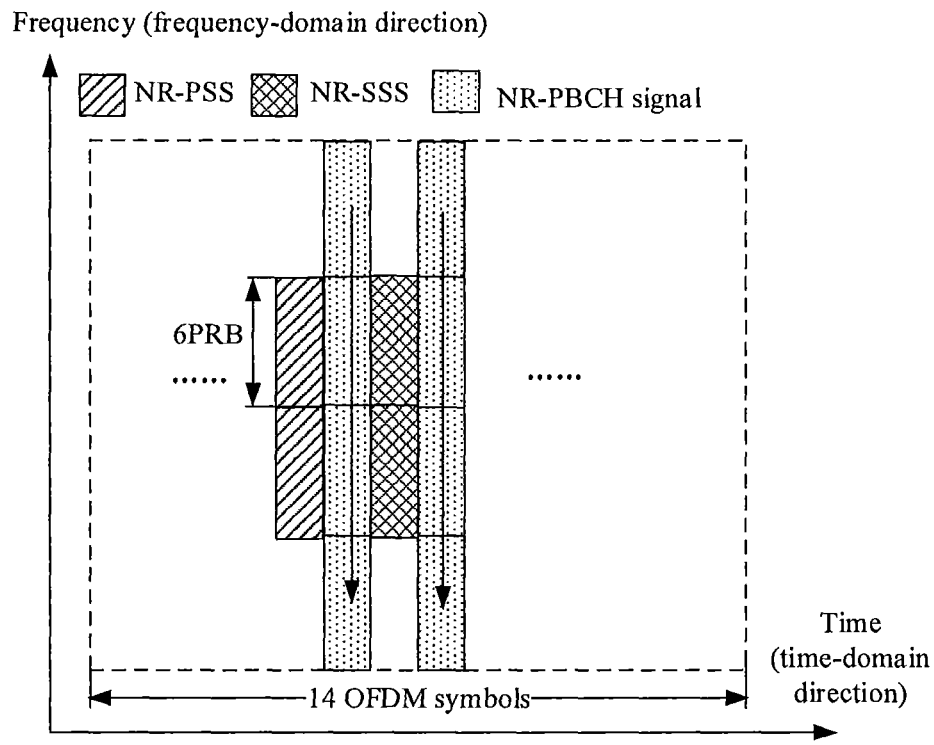
FIG. 7 shows a second schematic diagram of transmission resource mapping in a second manner according to an embodiment of the present disclosure.

Specifically, the 1-bit information is represented by different mapping modes of all or part of the DMRS sequences on the OFDM symbols where two NR-PBCHs are located. A mapping mode based on different orders includes: a mapping mode first in a frequency-domain direction and then in a time-domain direction; a mapping mode first in a time-domain direction and then in a frequency-domain direction; a mapping mode in a direction from a low frequency to a high frequency; or a mapping mode in a direction from a high frequency to a low frequency. Taking a mapping order in the frequency domain as an example, as shown in FIG. 6, in a case that the mapping mode in a direction from a low frequency to a high frequency, the case implicitly indicates a current SS block is located in the first 5 ms of the system frame. In a case that a mapping mode in an opposite direction (from a high frequency to a low frequency) is adopted, as shown in FIG. 7, the case implicitly indicates that a current SS block is located in the last 5 ms of the system frame.

Optionally, a DMRS sequence are grouped into different packets on time-frequency resources, and $c_0$ is indicated by different DMRS sub-sequences mapped to different packets. The grouping includes time-domain grouping and frequency-domain grouping. Specifically, a mapping mode based on time-domain symbols includes: the first half of the DMRS sequence corresponding to the first time-domain symbol in transmission resources of the NR-PBCH, and the second half of the DMRS sequence corresponding to the second time-domain symbol in the transmission resources of the NR-PBCH; or the first half of the DMRS sequence corresponding to the second time-domain symbol in transmission resources of the NR-PBCH, and the second half of the DMRS sequence corresponding to the first time-domain symbol in transmission resources of the NR-PBCH. As an example, if a DMRS sequence on the first time-domain symbol of the NR-PBCH is the first half of the DMRS sequence, and a DMRS sequence on the second time-domain symbol of the NR-PBCH is the second half of the DMRS sequence, it implicitly indicates that a current SS block is in the first 5 ms of the system frame; and if a DMRS sequence on the first time-domain symbol of the NR-PBCH is the second half of the DMRS sequence, and a DMRS sequence on the second time-domain symbol of the NR-PBCH is the first half of the DMRS sequence, it implicitly indicates that a current SS block is in the last 5 ms of the system frame. Moreover, a mapping mode based on frequency bands includes: the first half of the DMRS sequence corresponding to a first predetermined frequency band in transmission resources of the NR-PBCH, and the second half of the DMRS sequence corresponding to a second predetermined frequency band in transmission resources of the NR-PBCH; or the first half of the DMRS sequence corresponding to a second predetermined frequency band in transmission resources of the NR-PBCH, and the second half of the DMRS sequence corresponding a first predetermined frequency band in transmission resources of the NR-PBCH. As an example, one DMRS sequence is segmented into two parts according to a frequency band; in a case that the first half of the DMRS sequence is transmitted on a frequency band A, and the second half of the DMRS sequence is transmitted on a frequency band B, the case implicitly indicates that the current SS block is in the first 5 ms of the system frame; and in a case that the first half of the DMRS sequence is transmitted on a frequency band B, and the second half of the DMRS sequence is transmitted on a frequency band A, the case implicitly indicates that the current SS block is in the last 5 ms of the system frame.

A third manner includes: configuring a shift used by the DMRS sequence of the NR-PBCH. The shift used by the DMRS sequence is used to indicate the position relation between the SS block to which the NR-PBCH belongs and the system frame where the SS block is located, that is, the SS block being located in the first 5 ms of the system frame where the SS block is located; or the SS block being located in the last 5 ms of the system frame where the SS block is located.

The third manner is to indicate 1-bit information by using different shifts in the DMRS sequence, that is, the above indication $c_0$ that the SS block is located in the first 5 ms or in the last 5 ms of the system frame where the SS block is located.

Figure 8:
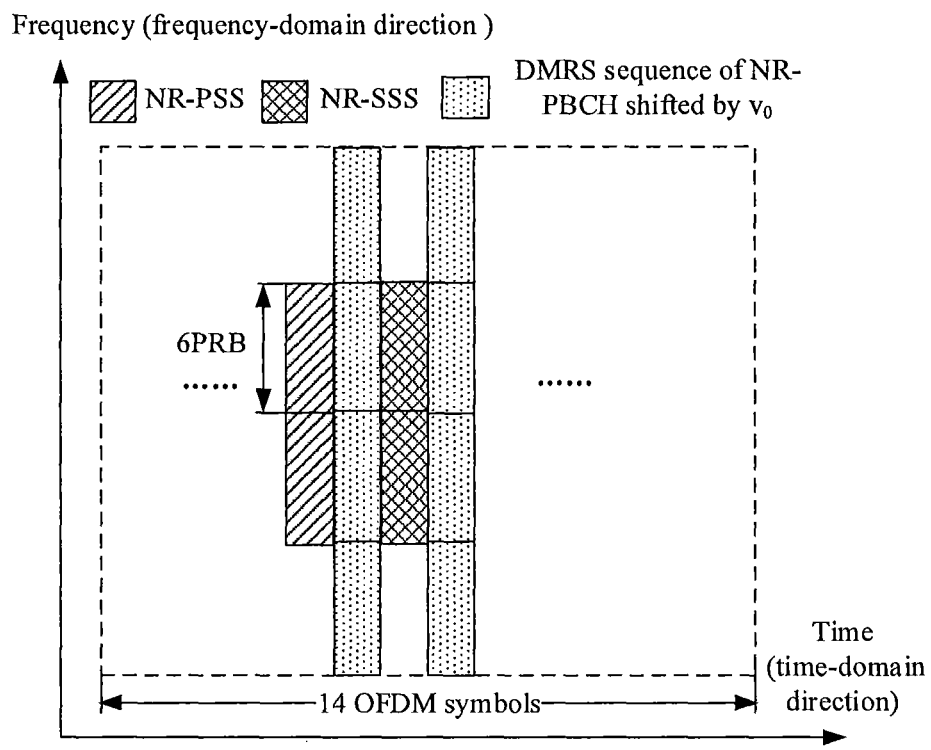
FIG. 8 shows a first schematic diagram of transmission resource mapping in a third manner according to an embodiment of the present disclosure.
Figure 9:
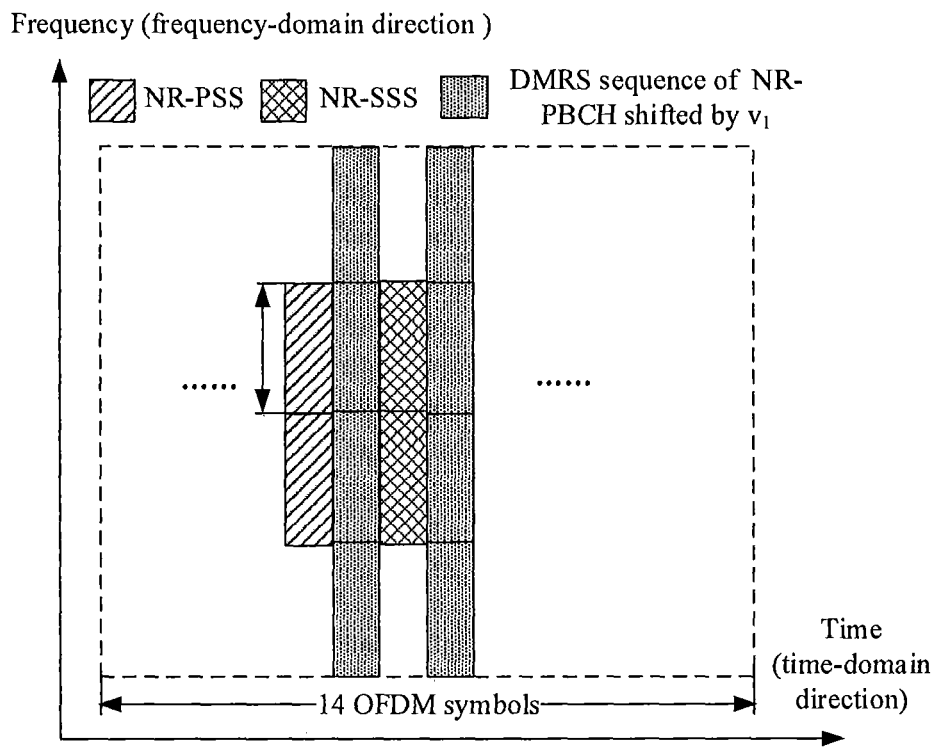
FIG. 9 shows a second schematic diagram of transmission resource mapping in a third manner according to an embodiment of the present disclosure.

Specifically, the 1-bit information is represented by different shifts of all or part of the DMRS sequences on two OFDM symbols where the NR-PBCHs are located. As an example, when a shift $v_0$ is used in the DMRS sequence, as shown in FIG. 8, it indicates transmission bit 0, which implicitly indicates that the current SS block is in the first 5 ms of the system frame; and when a shift vi is used in the DMRS sequence, as shown in FIG. 9, it indicates transmission bit 1, which implicitly indicates that the current SS block is in the last 5 ms of the system frame.

A fourth manner includes: configuring the DMRS sequence of the NR-PBCH as a gold sequence. The gold sequence is used to indicate the position relation between the SS block to which the NR-PBCH belongs and the system frame where the SS block is located, that is, whether the SS block is located in the first 5 ms or in the last 5 ms of a system frame where the SS block is located.

In the fourth manner, 1-bit information is indicated by using different gold sequences of the DMRS sequence, that is, the above-mentioned indication $c_0$ that the SS block is located in the first 5 ms or in the last 5 ms of the system frame where the SS block is located.

The forgoing descriptions illustrate specific embodiments of implicitly indicating the position relationship between the SS block and the system frame where the SS block is located based on the DMRS sequence. Specific embodiments about implicitly indicating an SS block time index through a DMRS sequence are further described below in the embodiments. Step 41 may be implemented specifically with reference to the following manners.

A fifth manner includes: configuring a predetermined parameter of the DMRS sequence of the NR-PBCH. The predetermined parameter is used to indicate M bits in an SS block time index, and M is an integer greater than 0. Specifically, M may be 2 or 3.

The predetermined parameter includes at least one of the following parameters: a gold sequence used by the DMRS sequence, a mapping mode of the gold sequence, an initialization mode of the gold sequence, or a shift of the gold sequence.

2 bits or 3 bits in the SS block time index are indicated through the DMRS sequence. The 2 bits or 3 bits may be high-order bits, low-order bits, or any of the bits in the SS block time index.

Specifically, the 2 bits or 3 bits in the SS block time index may be indicated by different gold sequences, different initialization modes, different mapping modes, and/or different shifts used by the DMRS sequence.

The indicating manner based on different gold sequences may specifically include: indicating 2 bits in the SS block time index through 4 different gold sequences (a length of a sequence shift register or a generator polynomial), or indicating 3 bits in the SS block time index through 8 different gold sequences. Additionally, 2 bits or 3 bits in the SS block time index, and $c_0$ may be indicated by different gold sequences, that is, indicating $c_0$ and 2 bits or 3 bits in the SS block time index by 8 or 16 gold sequences (a length of a sequence shift register or a generator polynomial).

Different initialization modes of a gold sequence are related to a cell ID, and may also be related to the SS block time index, and 2 bits or 3 bits of the SS block time index are indicated through different initializations.

Specifically, a gold sequence is obtained from two m sequences through an exclusive OR (XOR) operation, a length of the outputted gold sequence c(n) is M, where n=0, 1, . . . M−1, and the gold sequence may be initialized as follows:

$$c(n)=(x_1(n+N_c)+x_2(n+N_c)) \bmod 2 \qquad \text{formula 1;}$$

$$x_1(n+31)=(x_1(n+3)+x_1(n)) \bmod 2 \qquad \text{formula 2;}$$

$$x_2(n+31)=(x_2(n+3)+x_2(n+2)+x_2(n+1)+x_2(n)) \bmod 2 \qquad \text{formula 3;}$$

where $N_c$ represents a shift value of the gold sequence, $N_c$=1600, an initialization state of $x_1$ is $x_1(0)$=1, $x_1(n)$=0, n=0, 1, . . . , 30, an initialization state of $x_2$ is $c_{init}$= $(2N_{ID}^{Cell}+1) \cdot 2^{16}+S_{ID}$, $N_{ID}^{Cell}$ is an ID of a cell or a virtual cell, and $S_{ID}$ is an ID of a sequence with a different initialization. Each of formula 2 and formula 3 represents a polynomial generated by two m sequences, and the transmitted gold sequence is d(n)=1−2c(n).

Specifically, different DMRS sequences are generated based on different sequence initializations $S_{ID}$, different shift values, or different generator polynomials, and different information is indicated by different DMRS sequences. For example, when 1-bit information is required to be indicated through two DMRS sequences, sequences with two different initializations $S_{ID}$, or two differently shifted sequences, or gold sequences with two different generator polynomials are used for indication.

Further, different DMRS sequences may be generated based on a combination of two manners of using different sequence initializations $S_{ID}$ and using different shift values, and different information is indicated by different DMRS sequences.

As an example, in a case that 3 bits of information needs to be indicated through 8 sequences, 2 different sequence initializations $S_{ID}$ may be defined, for example $S_{ID}$=NJ), to generate two gold sequences, through which 1-bit information is indicated, 4 different shift values are further introduced into the 2 gold sequences, and 2-bit information is indicated through the 4 different shift values.

Further, different information may be indicated through different sequence initializations $S_{ID}$. For example, when 3 bits of information are required to be indicated through 8 DMRS sequences, 8 different sequence initializations $S_{ID}$ may be defined, for example $S_{ID}=\{0, 1, \ldots, 7\}$, to generate 8 gold sequences, and 3 bits of information are indicated through 8 sequences with different initializations.

In addition, 1-bit information may further be indicated through different mapping modes. For example, 2-bit information needs to be transmitted on a part of DMRS resources, which may be indicated as follows: two sequences using two different initializations $S_{ID}$ or using two different shifts may be defined to indicate 1-bit information, and the other 1-bit information is indicated by a forward mapping or a reverse mapping on DMRS resources.

In addition, 2 bits or 3 bits of the SS block time index may be indicated by different mapping modes, or different shifts of a gold sequence, or different mapping orders. A method of indicating the SS block time index in different mapping modes is similar to the method of indicating the position relation between the SS block and the system frame in which the SS block is located in the second manner, which is not repeated herein.

In the method for transmitting a DMRS of a physical broadcast channel according to the embodiments of the present disclosure, a network device configures a DMRS sequence of an NR-PBCH for a terminal, where the DMRS sequence implicitly indicates a position relation between an SS block and a system frame where the SS block is located, and the network device transmits the configured DMRS sequence to a terminal, so that the terminal obtains the position relation between the SS block and the system frame where the SS block is located, so as to solve a problem that whether a currently transmitted SS block and a system frame is in the first 5 ms or in the last 5 ms of the system frame can not be indicated in an NR system. Therefore, a position of a current SS block in a system frame can be more accurately indicated.

The method for transmitting a DMRS of a physical broadcast channel in different scenarios are described in detail in the above embodiments. In the following embodiments, a network device corresponding to the method will be further described in conjunction with the accompanying drawings.

Figure 10:
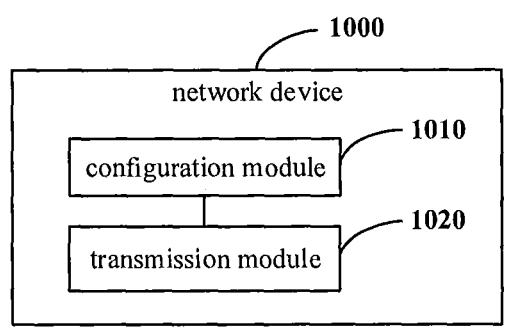
FIG. 10 shows a schematic diagram of a module structure of a network device according to an embodiment of the present disclosure.

As shown in FIG. 10, a network device 1000 is provided according to an embodiment of the present disclosure, which can implement the method details of configuring a demodulation reference signal DMRS sequence of a new radio physical broadcast channel NR-PBCH and transmitting the DMRS sequence of the NR-PBCH to a terminal, and achieves the same effects, where the DMRS sequence is configured to indicate a position relation between an SS block to which the NR-PBCH belongs and a system frame where the SS block is located. The network device 1000 specifically includes the following functional modules:

a configuration module 1010, configured to configure a demodulation reference signal DMRS sequence of a new radio physical broadcast channel NR-PBCH, where the DMRS sequence is configured to indicate a position relation between a synchronization signal block (SS block) to which the NR-PBCH belongs and a system frame where the SS block is located; and a transmission module 1020, configured to transmit the DMRS sequence of the NR-PBCH to a terminal.

The configuration module 1010 includes: a first configuration unit, configured to configure phase rotation information of the DMRS sequence of the NR-PBCH, where the phase rotation information of the DMRS sequence is configured to indicate the position relation between the SS block to which the NR-PBCH belongs and the system frame where the SS block is located, and the phase rotation information includes information of a phase difference between a phase of a DMRS sequence transmitted on a second time-domain symbol in transmission resources of the NR-PBCH and a phase of a DMRS sequence transmitted on a first time-domain symbol in the transmission resources of the NR-PBCH.

The configuration module 1010 further includes: a second configuration unit, configured to configure a mapping mode of the DMRS sequence of the NR-PBCH, where the mapping mode of the DMRS sequence is configured to indicate the position relation between the SS block to which the NR-PBCH belongs and the system frame where the SS block is located.

The mapping mode of the DMRS sequence includes at least one selected from the group of: a mapping mode based on different orders, a mapping mode based on a time-domain symbol, and a mapping mode based on a frequency band.

The configuration module 1010 further includes: a third configuration unit, configured to configure a shift used by the DMRS sequence of the NR-PBCH; where the shift used in the DMRS sequence of the NR-PBCH is configured to indicate the position relation between the SS block to which the NR-PBCH belongs and the system frame where the SS block is located.

The configuration module 1010 includes: a fourth configuration unit, configured to configure the DMRS sequence of the NR-PBCH as a gold sequence, where the gold sequence is configured to indicate the position relation between the SS block to which the NR-PBCH belongs and the system frame where the SS block is located.

The configuration module 1010 further includes: a fifth configuration unit, configured to configure a predetermined parameter of the DMRS sequence of the NR-PBCH, where the predetermined parameter is configured to indicate M bits in an SS block time index, and M is an integer greater than 0.

The predetermined parameter includes at least one selected from the following parameters: a gold sequence used by the DMRS sequence, a mapping mode of the gold sequence, an initialization mode of the gold sequence, and a shift of the gold sequence.

The position relation between the SS block to which the NR-PBCH belongs and the system frame where the SS block is located includes: the SS block being located in a first 5 ms or in a last 5 ms of the system frame where the SS block is located.

It should be noted that the network device according to the embodiments of the present disclosure configures a DMRS sequence of an NR-PBCH for a terminal, where the DMRS sequence implicitly indicates a position relation between an SS block and a system frame where the SS block is located, and the network device transmits the configured DMRS sequence to a terminal, so that the terminal obtains the position relation between the SS block and the system frame where the SS block is located, so as to solve a problem that whether a currently transmitted SS block is in the first 5 ms or in the last 5 ms of the system frame can not be indicated in an NR system. Therefore, a position of a current SS block in a system frame can be more accurately indicated.

In order to better achieve the foregoing objective, an embodiment of the present disclosure further provides a network device. The network device includes a processor, a memory, and a computer program stored on the memory and executable on the processor. When executing the computer program, the processor is configured to implement steps in the method for transmitting a DMRS of a physical broadcast channel as described above.

An embodiment of the present disclosure further provides a computer-readable storage medium. The computer-readable storage medium stores a computer program, and the computer program is executed by a processor to implement steps in the method for transmitting a DMRS of a physical broadcast channel as described above.

Figure 11:
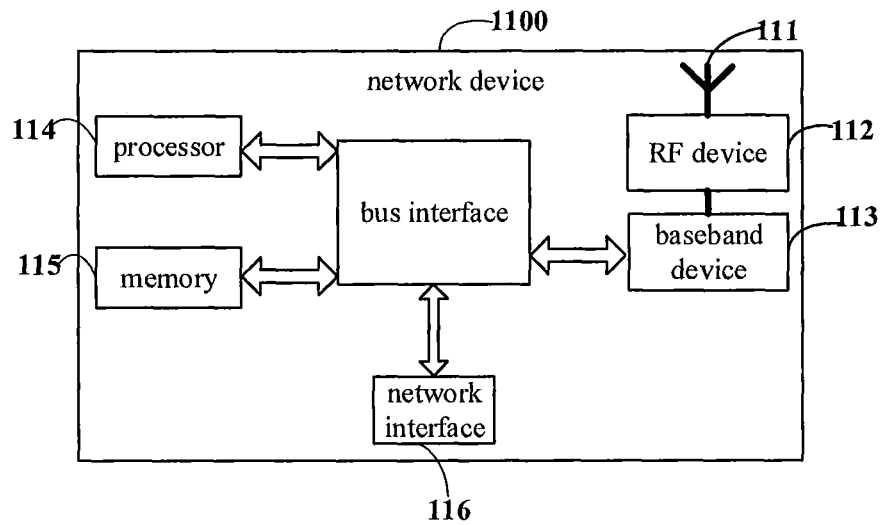
FIG. 11 shows a block diagram of a network device according to an embodiment of the present disclosure.

Specifically, an embodiment of the present disclosure further provides a network device. As shown in FIG. 11, the network device 1100 includes: an antenna 111, a radio frequency (RF) device 112 and a baseband device 113. The antenna 111 is connected to the RF device 112. In an uplink direction, the RF device 112 receives information through the antenna 111 and transmits the received information to the baseband device 113 for processing. In a downlink direction, the baseband device 113 processes information to be transmitted and transmits the information to the RF device 112, and the RF device 112 processes the received information and transmits the processed information out via the antenna 111.

The above-mentioned frequency band processing device may be located in the baseband device 113. The method performed by the network device in the above embodiments may be implemented in the baseband device 113. The baseband device 113 includes a processor 114 and a memory 115.

The baseband device 113 may include, for example, at least one baseband board. A plurality of chips is provided on the baseband board, as shown in FIG. 11. One of the chips is, for example, the processor 114 and is connected to the memory 115 to invoke a program in the memory 115 to perform operations of the network device in the above method embodiments.

The baseband device 113 may further include a network interface 116 for exchanging information with the RF device 112. The interface is, for example, a common public radio interface (CPRI).

The processor herein may be a processor or a collective name for multiple processing elements. For example, the processor may be a CPU, an ASIC, or one or more integrated circuits configured to implement the methods performed by the above network device, such as: one or more microprocessors DSPs, or one or more field programmable gate array FPGAs. A storage element may be a single memory or a collective term for multiple storage elements.

The memory 115 may be a volatile memory or a non-volatile memory, or may include both of the volatile memory and the non-volatile memory. The non-volatile memory may be a read-only memory (ROM), a programmable ROM (PROM), an erasable PROM (EPROM), an electrically EPROM (EEPROM) or a flash memory. The volatile memory may be a random access memory (RAM), which is used as an external cache. By way of example and without any limitation, many forms of RAMs may be used, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The memory 115 of the system and method described herein is meant to include, without limitation, these and any other suitable types of memories.

Specifically, the network device according to an embodiment of the present disclosure further includes: a computer program stored in the memory 115 and executable on the processor 114, and the processor 114 is configured to call the computer program in the memory 115 to perform the method executed by each module shown in FIG. 10.

Specifically, when calling the computer program, the processor 114 may be configured to: configure a demodulation reference signal DMRS sequence of a new radio physical broadcast channel NR-PBCH, where the DMRS sequence is configured to indicate a position relation between a synchronization signal block (SS block) to which the NR-PBCH belongs and a system frame where the SS block is located; and transmit the DMRS sequence of the NR-PBCH to a terminal.

Specifically, when calling the computer program, the processor 114 may be configured to: configure phase rotation information of the DMRS sequence of the NR-PBCH, where the phase rotation information of the DMRS sequence is configured to indicate the position relation between the SS block to which the NR-PBCH belongs and the system frame where the SS block is located.

Specifically, when calling the computer program, the processor 114 may be configured to: configure a mapping mode of the DMRS sequence of the NR-PBCH, where the mapping mode of the DMRS sequence is configured to indicate the position relation between the SS block to which the NR-PBCH belongs and the system frame where the SS block is located. The phase rotation information includes information of a phase difference between a phase of a DMRS sequence transmitted on a second time-domain symbol in transmission resources of the NR-PBCH and a phase of a DMRS sequence transmitted on a first time-domain symbol in the transmission resources of the NR-PBCH.

The mapping mode of the DMRS sequence includes at least one of: a mapping mode based on different orders, a mapping mode based on a time-domain symbol, or a mapping mode based on a frequency band.

Specifically, when calling the computer program, the processor 114 may be configured to: configure a shift used by the DMRS sequence of the NR-PBCH; where the shift used by the DMRS sequence of the NR-PBCH is configured to indicate the position relation between the SS block to which the NR-PBCH belongs and the system frame where the SS block is located.

Specifically, when calling the computer program, the processor 114 may be configured to: configure the DMRS sequence of the NR-PBCH as a gold sequence, where the gold sequence is configured to indicate the position relation between the SS block to which the NR-PBCH belongs and the system frame where the SS block is located.

Specifically, when calling the computer program, the processor 114 may be configured to: configure a predetermined parameter of the DMRS sequence of the NR-PBCH, where the predetermined parameter is configured to indicate M bits in an SS block time index, and M is an integer greater than 0.

The predetermined parameter includes at least one of the following parameters: a gold sequence used by the DMRS sequence, a mapping mode of the gold sequence, an initialization mode of the gold sequence, or a shift of the gold sequence.

The position relation between the SS block to which the NR-PBCH belongs and the system frame where the SS block is located includes: the SS block being located in a first 5 ms or in a last 5 ms of the system frame where the SS block is located.

A network device may be a global system of mobile communication (GSM) or a code division multiple access (CDMA) base transceiver station (BTS), or a wideband code division multiple access (WCDMA) NodeB (NB), or a LTE evolutional Node B (eNB or eNodeB), or a new radio access technical (New RAT or NR) base station, or a relay station or access point, or a future 5G network base station, etc., which is not limited herein.

In the embodiments of the present disclosure, a position relation between an SS block and a system frame is indicated through a DMRS sequence, so that a terminal can obtain the position relation between the SS block and the system frame according to the DMRS sequence, thereby improving utilization efficiency of the DMRS sequence.

The method for transmitting a DMRS of a physical broadcast channel applied in the network device side is described in above embodiments of the present disclosure. A method for transmitting a DMRS of a physical broadcast channel applied in a terminal side will be further described in conjunction with the accompanying drawings in the following embodiments.

Figure 12:
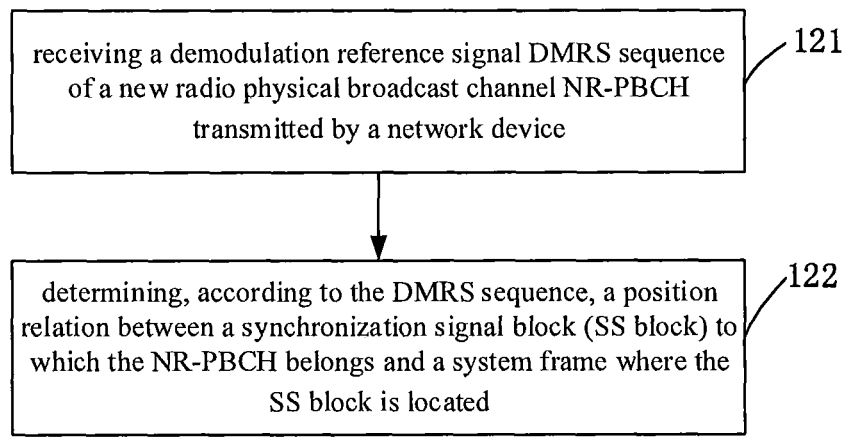
FIG. 12 shows a schematic flowchart of a method for transmitting a DMRS of a physical broadcast channel applied in a terminal side according to an embodiment of the present disclosure.

As shown in FIG. 12, a method for transmitting a DMRS of a physical broadcast channel is provided according to an embodiment of the present disclosure, which is applied to a terminal side, and specifically includes the following steps 121 and 122.

Step 121: receiving a demodulation reference signal DMRS sequence of a new radio physical broadcast channel NR-PBCH transmitted by a network device.

A position relation between a synchronization signal block (SS block) to which the NR-PBCH belongs and a system frame is different for different DMRS sequences. An SS block includes specific time information of a current transmission, including: SFN, indication $c_0$ for indicating whether the SS block is in the first 5 ms or in the last 5 ms of a system frame where the SS block is located, and a time index of the SS block (SS Block time index). The DMRS sequence is configured to indicate a position relation between an SS block to which the NR-PBCH belongs and a system frame where the SS block is located. The position relation between the SS block to which the NR-PBCH belongs and the system frame where the SS block is located includes: the SS block being located in the first 5 ms of the system frame where the SS block is located; or the SS block being located in the last 5 ms of the system frame where the SS block is located. That is, the DMRS sequence implicitly carries the indication $c_0$.

Step 122: determining, according to the DMRS sequence, a position relation between a synchronization signal block (SS block) to which the NR-PBCH belongs and a system frame where the SS block is located.

The terminal receives the DMRS sequence of the NR-PBCH that is configured and transmitted by a network device, and obtains the position relation between the SS block and the system frame where the SS block is located, so as to solve a problem that whether a currently transmitted SS block is in the first 5 ms or in the last 5 ms of the system frame can not be indicated in an NR system. Therefore, a current SS block can be accurately detected in transmission resources of a system frame.

In the embodiments of the present disclosure, a position relation between an SS block and a system frame is indicated through a DMRS sequence, so that a terminal can obtain the position relation between the SS block and the system frame according to the DMRS sequence, thereby improving utilization efficiency of the DMRS sequence.

Specifically, step 122 may be implemented with reference to the following manners.

A manner includes: detecting the DMRS sequence to determine phase rotation information of the DMRS sequence of the NR-PBCH; and determining, according to the phase rotation information, the position relation between the SS block to which the NR-PBCH belongs and the system frame where the SS block is located. The phase rotation information includes information of a phase difference between a phase of a DMRS sequence transmitted on a second time-domain symbol in transmission resources of the NR-PBCH and a phase of a DMRS sequence transmitted on a first time-domain symbol in the transmission resources of the NR-PBCH. The phase rotation information is used to implicitly indicate that the SS block is located in the first 5 ms of the system frame where the SS block is located; or the SS block is located in the last 5 ms of the system frame where the SS block is located. This manner corresponds to the first manner, and specific implementations of this manner can refer to the implementations of the above first manner, which will not be repeated herein.

A manner includes: detecting the DMRS sequence to determine a mapping mode of the DMRS sequence of the NR-PBCH; and determining, according to the mapping mode of the DMRS sequence, the position relation between the SS block to which the NR-PBCH belongs and the system frame where the SS block is located. The mapping mode of the DMRS sequence is used to implicitly indicate that the SS block is located in the first 5 ms of the system frame where the SS block is located; or the SS block is located in the last 5 ms of the system frame where the SS block is located. This manner corresponds to the second manner, and specific implementations of this manner can refer to the implementations of the above second manner, which will not be repeated herein. Further, the mapping mode of the DMRS sequence includes at least one of: a mapping mode based on different orders, a mapping mode based on a time-domain symbol, or a mapping mode based on a frequency band.

A manner includes: detecting the DMRS sequence to determine a shift used by the DMRS sequence of the NR-PBCH; and determining, according to the shift used by the DMRS sequence, the position relation between the SS block to which the NR-PBCH belongs and the system frame where the SS block is located. The shift used by the DMRS sequence is used to implicitly indicate that the SS block is located in the first 5 ms of the system frame where the SS block is located; or the SS block is located in the last 5 ms of the system frame where the SS block is located. This manner corresponds to the third manner, and specific implementations of this manner can refer to the implementations of the above third manner, which will not be repeated herein.

A manner includes: detecting the DMRS sequence to determine that the DMRS sequence of the NR-PBCH is a gold sequence; and determining, according to the gold sequence, the position relation between the SS block to which the NR-PBCH belongs and the system frame where the SS block is located. The gold sequence is used to implicitly indicate that the SS block is located in the first 5 ms of the system frame where the SS block is located; or the SS block is located in the last 5 ms of the system frame where the SS block is located. This manner corresponds to the fourth manner, and specific implementations of this manner can refer to the implementations of the above fourth manner, which will not be repeated herein.

The forgoing embodiments describe a terminal obtaining the position relation between the SS block and the system frame where the SS block is located based on the DMRS sequence. The terminal according to an embodiment can further obtain an SS block time index through a DMRS sequence.

Subsequent to step 121, the method further includes: determining an SS block time index of the SS block to which the NR-PBCH belongs according to the DMRS sequence.

Specifically, the determining the SS block time index of the SS block to which the NR-PBCH belongs according to the DMRS sequence includes: detecting the DMRS sequence to determine a predetermined parameter of the DMRS sequence; and determining the SS block time index of the SS block to which the NR-PBCH belongs according to the predetermined parameter, where the predetermined parameter is configured to indicate M bits in the SS block time index, M being an integer greater than 0, and M may be 2 or 3. This manner corresponds to the fifth manner, and specific implementations of this manner can refer to the implementations of the above fifth manner, which will not be repeated herein. Further, the predetermined parameter includes at least one of the following parameters: a gold sequence used by the DMRS sequence, a mapping mode of the gold sequence, an initialization mode of the gold sequence, or a shift of the gold sequence.

In the method for transmitting a DMRS of a physical broadcast channel according to the embodiments of the present disclosure, a terminal receives the DMRS sequence of the NR-PBCH that is configured and transmitted by a network device, and obtains the position relation between the SS block and the system frame where the SS block is located, so as to solve a problem that whether a currently transmitted SS block is in the first 5 ms or in the last 5 ms of the system frame can not be indicated in an NR system. Therefore, a position of a current SS block in a system frame can be more accurately detected.

The above embodiments describe the DMRS transmission method of the physical broadcast channel in different scenarios. A terminal corresponding to the method will be further described below with reference to the accompanying drawings.

Figure 13:
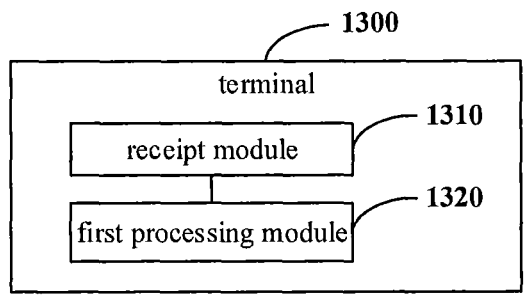
FIG. 13 shows a schematic diagram of a module structure of a terminal according to an embodiment of the present disclosure.

As shown in FIG. 13, a terminal 1300 is provided according to an embodiment of the present disclosure, which can implement the method details of receiving a demodulation reference signal DMRS sequence of a new radio physical broadcast channel NR-PBCH transmitted by a network device; and determining, according to the DMRS sequence, a position relation between an SS block to which the NR-PBCH belongs and a system frame where the SS block is located, and achieves the same effects. The terminal 1300 specifically includes the following functional modules:

a receipt module 1310, configured to receive a demodulation reference signal DMRS sequence of a new radio physical broadcast channel NR-PBCH transmitted by a network device; and a first processing module 1320, configured to determine, according to the DMRS sequence, a position relation between a synchronization signal block (SS block) to which the NR-PBCH belongs and a system frame where the SS block is located.

The first processing module 1320 includes:
a first detecting unit, configured to detect the DMRS sequence to determine phase rotation information of the DMRS sequence of the NR-PBCH;
a first processing unit, configured to determine, according to the phase rotation information, the position relation between the SS block to which the NR-PBCH belongs and the system frame where the SS block is located.

The first processing module 1320 includes:
a second detection unit, configured to detect the DMRS sequence to determine a mapping mode of the DMRS sequence of the NR-PBCH; where the phase rotation information includes information of a phase difference between a phase of a DMRS sequence transmitted on a second time-domain symbol in transmission resources of the NR-PBCH and a phase of a DMRS sequence transmitted on a first time-domain symbol in the transmission resources of the NR-PBCH; and a second processing unit, configured to determine, according to the mapping mode of the DMRS sequence, the position relation between the SS block to which the NR-PBCH belongs and the system frame where the SS block is located.

The mapping mode of the DMRS sequence includes at least one of: a mapping mode based on different orders, a mapping mode based on a time-domain symbol, or a mapping mode based on a frequency band.

The first processing module 1320 includes:
a third detection unit, configured to detect the DMRS sequence to determine a shift used by the DMRS sequence of the NR-PBCH; and
a third processing unit, configured to determine, according to the shift used by the DMRS sequence, the position relation between the SS block to which the NR-PBCH belongs and the system frame where the SS block is located.

The first processing module 1320 includes:
a fourth detection unit, configured to detect the DMRS sequence to determine that the DMRS sequence of the NR-PBCH is a gold sequence; and
a fourth processing unit, configured to determine, according to the gold sequence, the position relation between the SS block to which the NR-PBCH belongs and the system frame where the SS block is located.

The terminal 1300 further includes: a second processing module, configured to determine an SS block time index of the SS block to which the NR-PBCH belongs according to the DMRS sequence.

The second processing module includes:
a fifth detection unit, configured to detect the DMRS sequence to determine a predetermined parameter of the DMRS sequence, where the predetermined parameter is configured to indicate M bits in the SS block time index, M being an integer greater than 0; and
a fifth processing unit, configured to determine the SS block time index of the SS block to which the NR-PBCH belongs according to the predetermined parameter.

The predetermined parameter includes at least one of the following parameters: a gold sequence used by the DMRS sequence, a mapping mode of the gold sequence, an initialization mode of the gold sequence, or a shift of the gold sequence.

The position relation between the SS block to which the NR-PBCH belongs and the system frame where the SS block is located includes: the SS block being located in a first 5 ms or in a last 5 ms of the system frame where the SS block is located.

In the embodiments of the present disclosure, a position relation between an SS block and a system frame is indicated through a DMRS sequence, so that the terminal can obtain the position relation between the SS block and the system frame according to the DMRS sequence, thereby improving utilization efficiency of the DMRS sequence.

It should be noted that the modular division of the network device and the terminal may be understood as merely a logical function division, and in actual implementation, the modules may be integrated entirely or partly to one physical entity or physically separated. These modules may be entirely implemented in form of software that may be called and executed by a processing element, or entirely implemented in form of hardware, or partly implemented in form of software that may be called and executed by a processing element and partly implemented in form of hardware. For example, a determination module may be a standalone processing element, or integrated in a chip of the device, or may be stored in a storage of the device in form of program code which is configured to be called by a processing element of the device to implement the function of the determination module. Other modules may be implemented in a similar way. In addition, the modules may be entirely or partly integrated together, or implemented separately. The described processing element may be an integrated circuit with signal processing capability. During an implementation process, steps of the methods or the modules may be realized in form of hardware by integrated logical circuits in the processing element, or in form of software by instructions.

For example, these modules may be one or more integrated circuits (IC) configured to implement the foregoing methods, e.g., one or more Application Specific Integrated Circuits (ASIC), one or more Digital Signal Processors (DSP), or one or more Field-Programmable Gate Arrays (FPGA), etc. For another example, when a module is implemented in form of program code configured to be called by a processing element, the processing element may be a general purpose processor, e.g., a central processing unit (CPU) or other processor configured to call program code. For another example, these modules may be integrated together in form of a system-on-a-chip (SOC).

To better achieve the foregoing objective, an embodiment of the present disclosure further provide a terminal. The terminal includes a processor, a memory and a computer program stored in the memory and executable by the processor. When executing the computer program, the processor is configured to implement steps of the method for transmitting a DMRS of a physical broadcast channel as described above.

An embodiment of the present disclosure further provides a computer-readable storage medium. The computer-readable storage medium stores a computer program, and the computer program is executed by a processor to implement steps of the method for transmitting a DMRS of a physical broadcast channel as described above.

Figure 14:
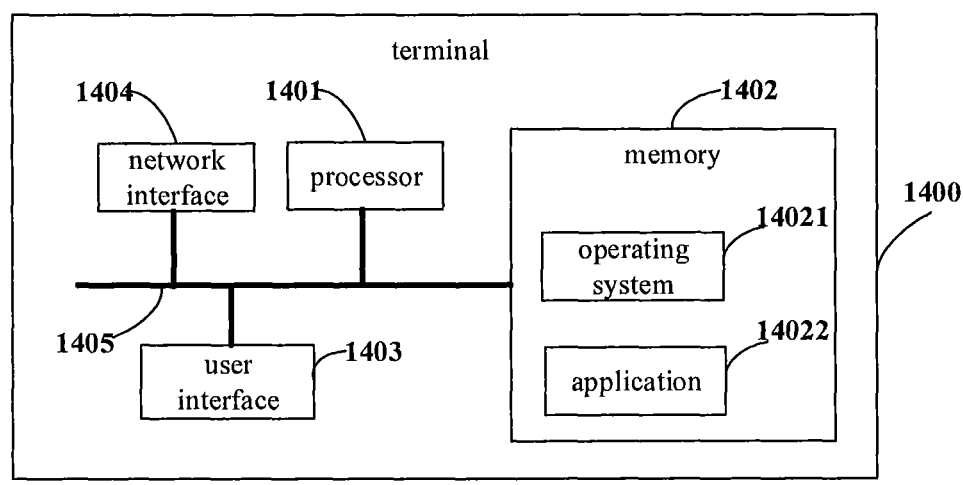
FIG. 14 shows a block diagram of a terminal according to an embodiment of the present disclosure.

In specific, FIG. 14 is a block diagram of a terminal 1400 provided by another embodiment of the present disclosure. As shown in FIG. 14, the terminal includes: at least one processor 1401, a memory 1402, a user interface 1403, and a network interface 1404. Various components in the terminal 1400 are coupled together through a bus system 1405. It can be understood that the bus system 1405 is configured to implement connections and communications between these components. The bus system 1405 includes a power bus, a control bus, and a status signal bus, in addition to a data bus. For the sake of clarity, various buses are all labeled as the bus system 1405 in FIG. 14.

The user interface 1403 may include a display, or a click device (e.g., a touchpad), or a touch screen, etc.

It is understood that the memory 1402 in embodiments of the present disclosure may be a volatile memory or a non-volatile memory, or may include both of the volatile memory and the non-volatile memory. The non-volatile memory may be a read-only memory (ROM), a programmable ROM (PROM), an erasable PROM (EPROM), an electrically EPROM (EEPROM) or a flash memory. The volatile memory may be a random access memory (RAM), which is used as an external cache. By way of example and without any limitation, many forms of RAMs may be used, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The memory 1402 of the system and method described herein is meant to include, without limitation, these and any other suitable types of memories.

In some embodiments, the memory 1402 stores the following elements: executable module or data structure, or a subset or extension set thereof, such as an operating system 14021 and an application 14022.

The operating system 14021 includes various system programs, such as framework layer programs, core library layer programs and driver layer programs, to implement various fundamental services and process hardware-based tasks. The application 14022 includes various applications, such as media player and browser, to implement a variety of application services. The program implementing the method according to embodiments of the present disclosure may be included in the application 14022.

In an embodiment of the present disclosure, the terminal 1400 further includes: a computer program stored in the memory 1402 and executable by the processor 1401, specifically, a computer program in the application 14022, and the computer program is executed by the processor 1401 to achieve the following steps: receiving a demodulation reference signal DMRS sequence of a new radio physical broadcast channel NR-PBCH transmitted by a network device; and determining, according to the DMRS sequence, a position relation between a synchronization signal block (SS block) to which the NR-PBCH belongs and a system frame where the SS block is located.

The method disclosed in the foregoing embodiments of the present disclosure may be applied to the processor 1401 or implemented by the processor 1401. The processor 1401 may be an integrated circuit with signal processing capability. During an implementation process, steps of the methods may be realized in form of hardware by integrated logical circuits in the processor 1401, or in form of software by instructions. The processor 1401 may be a general purpose processor, digital signal processor (DSP), application specific integrated circuit (ASIC), field programmable gate array (FPGA) or other programmable logic device, discrete gate or transistor logic device, discrete hardware transistor logic device, discrete hardware component, that is capable of implementing or executing the various methods, steps and logic block diagrams disclosed in the embodiments of the present disclosure. The general purpose processor may be a microprocessor, or any conventional processor, etc. The steps of the methods disclosed with reference to the embodiments of the present disclosure may be embodied in hardware in the form of a coding processor, or performed by the hardware in the coding processor and the software modules in combination. The software modules may reside in well-established storage medium in the art, such as a RAM, flash memory, ROM, PROM or EEPROM, register, etc. The storage medium resides in the memory 1402. The processor 1401 reads information from the memory 1402 and performs the steps of the methods with its hardware.

It is understood that the embodiments described in the present disclosure may be implemented by hardware, software, firmware, middleware, microcode or a combination thereof. For hardware implementation, processing units may be implemented in one or more application specific integrated circuits (ASIC), digital signal processor (DSP), DSP device (DSPD), programmable logic device (PLD), field-programmable gate array (FPGA), general purpose processor, controller, microcontroller, microprocessor, other electronic unit configured to perform the function described in this application or a combination thereof.

For software implementation, the technical solutions described in the embodiments of the present disclosure may be implemented by a module (e.g., process, function, etc.) configured to perform the function described in the embodiments of the present disclosure. Software code may be stored in a storage and executed by the processor. The storage may be implemented internal or external to the processor.

In specific, the computer program is configured to be executed by the processor 1401 to implement following steps:

detecting the DMRS sequence to determine phase rotation information of the DMRS sequence of the NR-PBCH, where the phase rotation information includes information of a phase difference between a phase of a DMRS sequence transmitted on a second time-domain symbol in transmission resources of the NR-PBCH and a phase of a DMRS sequence transmitted on a first time-domain symbol in the transmission resources of the NR-PBCH; and determining, according to the phase rotation information, the position relation between the SS block to which the NR-PBCH belongs and the system frame where the SS block is located.

Specifically, the computer program is configured to be executed by the processor 1401 to implement following steps:

detecting the DMRS sequence to determine a mapping mode of the DMRS sequence of the NR-PBCH; and determining, according to the mapping mode of the DMRS sequence, the position relation between the SS block to which the NR-PBCH belongs and the system frame where the SS block is located.

The mapping mode of the DMRS sequence includes at least one of: a mapping mode based on different orders, a mapping mode based on a time-domain symbol, or a mapping mode based on a frequency band.

Specifically, the computer program is configured to be executed by the processor 1401 to implement following steps: detecting the DMRS sequence to determine a shift used by the DMRS sequence of the NR-PBCH; and determining, according to the shift used by the DMRS sequence, the position relation between the SS block to which the NR-PBCH belongs and the system frame where the SS block is located.

Specifically, the computer program is configured to be executed by the processor 1401 to implement following steps: detecting the DMRS sequence to determine that the DMRS sequence of the NR-PBCH is a gold sequence; and determining, according to the gold sequence, the position relation between the SS block to which the NR-PBCH belongs and the system frame where the SS block is located.

Specifically, the computer program is configured to be executed by the processor 1401 to implement following steps: determining an SS block time index of the SS block to which the NR-PBCH belongs according to the DMRS sequence.

Specifically, the computer program is configured to be executed by the processor 1401 to implement following steps: detecting the DMRS sequence to determine a predetermined parameter of the DMRS sequence, where the predetermined parameter is configured to indicate M bits in the SS block time index, M being an integer greater than 0; and determining the SS block time index of the SS block to which the NR-PBCH belongs according to the predetermined parameter.

Specifically, the predetermined parameter includes at least one of the following parameters: a gold sequence used by the DMRS sequence, a mapping mode of the gold sequence, an initialization mode of the gold sequence, or a shift of the gold sequence.

Specifically, the position relation between the SS block to which the NR-PBCH belongs and the system frame where the SS block is located includes: the SS block being located in a first 5 ms or in a last 5 ms of the system frame where the SS block is located.

The terminal may be a wireless terminal or a wired terminal. A wireless terminal may refer to a device used to provide voice and/or other service data connectivity to a user, a hand-held device with a wireless connection function, or another processing device connected to a wireless modem. A wireless terminal may communicate with one or more core networks via a radio access network (RAN). The wireless terminal may be a mobile terminal, such as a mobile phone (also called cellphone) or a computer equipped with a mobile terminal, such as a portable, pocket-sized, hand-held, computer built-in, or vehicle-mounted mobile device, which exchanges voice and/or data with the radio access network. For example, it may be a personal communication service (PCS) phone, a cordless phone, a session initiation protocol (SIP) phone, a wireless local loop (WLL) station, a personal digital assistant (PDA), or the like. A wireless terminal may also be referred to as a system, a subscriber unit, a subscriber station, a mobile station, a mobile, a remote station, a remote terminal, an access terminal, a user terminal, a user agent, or a user device or user equipment, and is not limited herein.

In the embodiments of the present disclosure, a position relation between an SS block and a system frame is indicated through a DMRS sequence, so that a terminal can obtain the position relation between the SS block and the system frame based on the DMRS sequence, thereby improving utilization efficiency of the DMRS sequence.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for ease of description and conciseness, for a detailed working process of the foregoing system, apparatus, and unit, reference may be made to a corresponding process in the foregoing method embodiments, and details are not described herein again.

In the embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be neglected or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, essential part or the part contributing to the prior art of the technical solutions of the present disclosure, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the disclosure. The foregoing storage medium includes any medium that may store program code, such as a universal serial bus (USB) flash drive, a mobile hard disk, an ROM, an RAM, a magnetic disk, or an optical disc.

Further, it is noted, apparently, the components or steps in the apparatus and method of the present disclosure may be subdivided and/or recombined. These subdivisions and/or recombinations should be considered as equivalent solutions to the present disclosure. Moreover, the steps of the foregoing series of process may be performed naturally in a chronological order in which the steps are described, however, the steps are not necessarily performed in the chronological order. Instead, some steps may be performed concurrently or independently of each other. It is appreciated by a person of ordinary skill in the art that, all or any steps or components of the method and apparatus of the present disclosure may be implemented in form of hardware, firmware, software or a combination thereof in any computing device (including a processor, storage medium or the like) or a network of computing devices, which may be realized by a person of ordinary skill in the art, having read the description of the present disclosure, and using basic programing skills.

Therefore, the objective of the present disclosure may further be achieved by running a program or a group of programs on any computing device. The computing device may be a well-known general-purpose device. Thus, the objective of the present disclosure may further be achieved by providing a program product including program codes configured to implement the method or apparatus. In other words, such a program product constitutes the present disclosure, and a storage medium storing such a program product also constitutes the present disclosure. Obviously, the storage medium may be any well-known storage medium or any storage medium to be developed in the future. It is also noted, apparently, the components or steps in the apparatus and method of the present disclosure may be subdivided and/or recombined. These subdivisions and/or recombinations should be considered as equivalent solutions to the present disclosure. Moreover, the steps of the foregoing series of process may be performed naturally in a chronological order in which the steps are described, however, the steps are not necessarily performed in the chronological order. Instead, some steps may be performed concurrently or independently of each other.

The above descriptions merely describe optional implementations of the present disclosure. It should be noted that, numerous modifications and improvements may be made by a person of ordinary skill in the art without departing from the principle of the present disclosure, and these modifications and improvements shall fall within the protection scope of the present disclosure.

What is claimed is:

1. A method for transmitting a DMRS of a physical broadcast channel, applied to a network device side, and comprising:
    configuring a demodulation reference signal DMRS sequence of a new radio physical broadcast channel NR-PBCH, wherein the DMRS sequence is configured to indicate a position relation between a synchronization signal block (SS block) to which the NR-PBCH belongs and a system frame where the SS block is located; and
    transmitting the DMRS sequence of the NR-PBCH to a terminal,
    wherein the configuring the DMRS sequence of the NR-PBCH comprises:
    configuring phase rotation information of the DMRS sequence of the NR-PBCH, wherein the phase rotation information of the DMRS sequence is configured to indicate the position relation between the SS block to which the NR-PBCH belongs and the system frame where the SS block is located, and the phase rotation information comprises information of a phase difference between a phase of a DMRS sequence transmitted on a second time-domain symbol in transmission resources of the NR-PBCH and a phase of a DMRS sequence transmitted on a first time-domain symbol in the transmission resources of the NR-PBCH.

2. The method for transmitting a DMRS of a physical broadcast channel according to claim 1, wherein the configuring the DMRS sequence of the NR-PBCH further comprises:
    configuring a mapping mode of the DMRS sequence of the NR-PBCH, wherein the mapping mode of the DMRS sequence is configured to indicate the position relation between the SS block to which the NR-PBCH belongs and the system frame where the SS block is located.

3. The method for transmitting a DMRS of a physical broadcast channel according to claim 2, wherein the mapping mode of the DMRS sequence comprises at least one of: a mapping mode based on different orders, a mapping mode based on a time-domain symbol, or a mapping mode based on a frequency band.

4. The method for transmitting a DMRS of a physical broadcast channel according to claim 1, wherein the configuring the DMRS sequence of the NR-PBCH further comprises:
    configuring a shift used by the DMRS sequence of the NR-PBCH; wherein the shift used by the DMRS sequence is configured to indicate the position relation between the SS block to which the NR-PBCH belongs and the system frame where the SS block is located; or
    configuring the DMRS sequence of the NR-PBCH as a gold sequence, wherein the gold sequence is configured to indicate the position relation between the SS block to which the NR-PBCH belongs and the system frame where the SS block is located.

5. The method for transmitting a DMRS of a physical broadcast channel according to claim 1, wherein the configuring the DMRS sequence of the NR-PBCH further comprises:
configuring a predetermined parameter of the DMRS sequence of the NR-PBCH, wherein the predetermined parameter is configured to indicate M bits in an SS block time index, and M is an integer greater than 0.

6. The method for transmitting a DMRS of a physical broadcast channel according to claim 5, wherein the predetermined parameter comprises at least one selected from the following parameters:
a gold sequence used by the DMRS sequence, a mapping mode of the gold sequence, an initialization mode of the gold sequence, and a shift of the gold sequence.

7. The method for transmitting a DMRS of a physical broadcast channel according to claim 1, wherein the position relation between the SS block to which the NR-PBCH belongs and the system frame where the SS block is located comprises:
the SS block being located in a first 5 ms or in a last 5 ms of the system frame where the SS block is located.

8. A network device, comprising:
a processor, a memory, and a computer program that is stored on the memory and executable on the processor, wherein, when executing the computer program, the processor is configured to:
configure a demodulation reference signal DMRS sequence of a new radio physical broadcast channel NR-PBCH, wherein the DMRS sequence is configured to indicate a position relation between a synchronization signal block (SS block) to which the NR-PBCH belongs and a system frame where the SS block is located; and
transmit the DMRS sequence of the NR-PBCH to a terminal,
wherein the Processor is configured to:
configure phase rotation information of the DMRS sequence of the NR-PBCH, wherein the phase rotation information of the DMRS sequence is configured to indicate the position relation between the SS block to which the NR-PBCH belongs and the system frame where the SS block is located, and the phase rotation information comprises information of a phase difference between a phase of a DMRS sequence transmitted on a second time-domain symbol in transmission resources of the NR-PBCH and a phase of a DMRS sequence transmitted on a first time-domain symbol in the transmission resources of the NR-PBCH.

9. The network device according to claim 8,
wherein the processor is further configured to:
configure a mapping mode of the DMRS sequence of the NR-PBCH, wherein the mapping mode of the DMRS sequence is configured to indicate the position relation between the SS block to which the NR-PBCH belongs and the system frame where the SS block is located, and the mapping mode of the DMRS sequence comprises at least one of: a mapping mode based on different orders, a mapping mode based on a time-domain symbol, or a mapping mode based on a frequency band; or
wherein the processor is further configured to: configure a shift used by the DMRS sequence of the NR-PBCH, wherein the shift used by the DMRS sequence of the NR-PBCH is configured to indicate the position relation between the SS block to which the NR-PBCH belongs and the system frame where the SS block is located; or
wherein the processor is further configured to: configure the DMRS sequence of the NR-PBCH as a gold sequence, wherein the gold sequence is configured to indicate the position relation between the SS block to which the NR-PBCH belongs and the system frame where the SS block is located.

10. The network device according to claim 8, wherein the processor is configured to:
configure a predetermined parameter of the DMRS sequence of the NR-PBCH, wherein the predetermined parameter is configured to indicate M bits in an SS block time index, and M is an integer greater than 0.

11. The network device according to claim 10, wherein the predetermined parameter comprises at least one selected from the following parameters:
a gold sequence used by the DMRS sequence, a mapping mode of the gold sequence, an initialization mode of the gold sequence, and a shift of the gold sequence.

12. The network device according to claim 8, wherein the position relation between the SS block to which the NR-PBCH belongs and the system frame where the SS block is located comprises:
the SS block being located in a first 5 ms or in a last 5 ms of the system frame where the SS block is located.

13. A method for transmitting a DMRS of a physical broadcast channel, applied to a terminal side, and comprising:
receiving a demodulation reference signal DMRS sequence of a new radio physical broadcast channel NR-PBCH transmitted by a network device; and
determining, according to the DMRS sequence, a position relation between a synchronization signal block (SS block) to which the NR-PBCH belongs and a system frame where the SS block is located,
wherein the determining, according to the DMRS sequence, the position relation between the SS block to which the NR-PBCH belongs and the system frame where the SS block is located comprises:
detecting the DMRS sequence to determine phase rotation information of the DMRS sequence of the NR-PBCH, wherein the phase rotation information comprises information of a phase difference between a phase of a DMRS sequence transmitted on a second time-domain symbol in transmission resources of the NR-PBCH and a phase of a DMRS sequence transmitted on a first time-domain symbol in the transmission resources of the NR-PBCH; and
determining, according to the phase rotation information, the position relation between the SS block to which the NR-PBCH belongs and the system frame where the SS block is located.

14. The method for transmitting a DMRS of a physical broadcast channel according to claim 13, wherein the determining, according to the DMRS sequence, the position relation between the SS block to which the NR-PBCH belongs and the system frame where the SS block is located further comprises:
detecting the DMRS sequence to determine that the DMRS sequence of the NR-PBCH is a gold sequence; and determining, according to the gold sequence, the position relation between the SS block to which the NR-PBCH belongs and the system frame where the SS block is located.

15. The method for transmitting a DMRS of a physical broadcast channel according to claim 13, wherein after receiving the DMRS sequence of the NR-PBCH transmitted by the network device, the method further comprises:
determining an SS block time index of the SS block to which the NR-PBCH belongs according to the DMRS sequence.

16. The method for transmitting a DMRS of a physical broadcast channel according to claim 15, wherein the determining the SS block time index of the SS block to which the NR-PBCH belongs according to the DMRS sequence comprises:
detecting the DMRS sequence to determine a predetermined parameter of the DMRS sequence, wherein the predetermined parameter is configured to indicate M bits in the SS block time index, M being an integer greater than 0; and
determining the SS block time index of the SS block to which the NR-PBCH belongs according to the predetermined parameter.

17. The method for transmitting a DMRS of a physical broadcast channel according to claim 16, wherein the predetermined parameter comprises at least one selected from the following parameters:
a gold sequence used by the DMRS sequence, a mapping mode of the gold sequence, an initialization mode of the gold sequence, and a shift of the gold sequence.

18. The method for transmitting a DMRS of a physical broadcast channel according to claim 13, wherein the position relation between the SS block to which the NR-PBCH belongs and the system frame where the SS block is located comprises:
the SS block being located in a first 5 ms or in a last 5 ms of the system frame where the SS block is located.

19. A terminal, comprising:
a processor, a memory, and a computer program that is stored on the memory and executable on the processor, wherein, when executing the computer program, the processor is configured to implement steps in the method for transmitting a DMRS of a physical broadcast channel according to claim 13.

20. A non-transitory computer-readable storage medium, wherein a computer program is stored in the non-transitory computer-readable storage medium, and the computer program, when executed by a processor, causes the processor to implement steps in the method for transmitting a DMRS of a physical broadcast channel according to claim 1.

* * * * *